(12) United States Patent
Singh et al.

(10) Patent No.: US 7,841,634 B2
(45) Date of Patent: Nov. 30, 2010

(54) TIRE LOADER BASKET

(75) Inventors: Anand Pal Singh, Akron, OH (US);
Sivaram Addanki Krishnayya, Hudson, OH (US); William Forte Franchim, Stow, OH (US)

(73) Assignee: McNeil & NRM, Inc., Akron, OH (US)

( * ) Notice: Subject to any disclaimer, the term of this patent is extended or adjusted under 35 U.S.C. 154(b) by 483 days.

(21) Appl. No.: 12/004,782

(22) Filed: Dec. 20, 2007

(65) Prior Publication Data
US 2010/0159048 A1 Jun. 24, 2010

(51) Int. Cl.
*B29D 30/06* (2006.01)
*B25J 15/10* (2006.01)

(52) U.S. Cl. .............................. 294/93; 294/97; 294/88; 425/38

(58) Field of Classification Search .................. 294/93, 294/97, 88, 119.2; 156/406.2, 420; 425/38
See application file for complete search history.

(56) References Cited

U.S. PATENT DOCUMENTS

| | | | |
|---|---|---|---|
| 3,924,983 A * | 12/1975 | Barton et al. ................. | 425/38 |
| 4,279,438 A * | 7/1981 | Singh .......................... | 294/88 |
| 4,437,920 A | 3/1984 | Kubo | |
| 4,547,012 A | 10/1985 | Krebs .......................... | 294/93 |
| 4,744,739 A | 5/1988 | Singh ........................ | 425/34.1 |
| 4,871,305 A | 10/1989 | Galigani | |
| 5,441,587 A | 8/1995 | Byerley | |
| 5,709,768 A | 1/1998 | Byerley | |
| 5,716,089 A | 2/1998 | Singh | |
| 5,830,513 A | 11/1998 | Fukuda | |
| 5,858,165 A | 1/1999 | Takasuga .................... | 156/403 |
| 7,370,897 B2 * | 5/2008 | Fukazawa ................ | 294/119.2 |

FOREIGN PATENT DOCUMENTS

DE     39 10 886     10/1989

OTHER PUBLICATIONS

A picture of a prior art product made by Ichimaru-Giken, Fukuoka, Japan.
European Search Report (dated Apr. 2, 2009—8 pages).

* cited by examiner

*Primary Examiner*—Dean J Kramer
(74) *Attorney, Agent, or Firm*—Renner, Kenner, Greive, Bobak, Taylor & Weber

(57) ABSTRACT

A loader basket for gripping, transporting, and releasing tires, including a fixed ring, a rotating ring operatively interrelated with the fixed ring, a plurality of shoe arms pivotally attached to the fixed ring, shoe assemblies pivotally mounted on each of the shoe arms, alignment links pivotally mounted on the fixed ring and pivotally attached to each of the shoe assemblies, shoe arm actuating rods pivotally attached to each of the shoe arms and the rotating ring for pivoting the shoe arms about the fixed rings while maintaining the shoe assemblies in concentric relation during movement between collapsed and expanded positions, and an actuator for selectively moving the rotating ring relative to the fixed ring.

20 Claims, 9 Drawing Sheets

TIRE LOADER BASKET

TECHNICAL FIELD

The present invention relates generally to apparatus for loading uncured tires into a tire curing press. More particularly, the present invention relates to a loader basket which is a portion of a loader assembly that operates to position uncured tires in a tire curing press preparatory to carrying out the tire vulcanization process. More specifically, the present invention relates to a loader basket of a loader assembly which grips an uncured tire positioned proximate a tire curing press, maintains engagement with the uncured tire while the loader assembly moves the loader basket to a position proximate the lower mold cavity of the tire curing press, and releases the uncured tire at a precise position relative to the lower mold cavity preparatory to closure of the tire curing press and commencement of the tire vulcanization process.

BACKGROUND ART

Tire loading apparatus has been employed in conjunction with tire curing presses for many years. Originally, tire loading apparatus was developed for purposes of automation to relieve the labor-intensive operations which had, for many years, characterized the production of pneumatic tires. Early tire loading apparatus employed in conjunction with tire curing presses did not place emphasis on positioning accuracy of the tire baskets of tire loading apparatus, as such was not deemed to be of particular importance, and center mechanisms were designed to carry out alignment functions to the extent such was deemed to be of importance by tire manufacturers. Variations in tire loading apparatus were primarily made to accommodate particular types of tire curing press center mechanisms and to accommodate particular tire configurations that evolved.

Since the virtual universal acceptance of radial-ply tires, tire manufacturers have adopted the philosophy that accurate location of an uncured tire at the center of the lower mold cavity of a tire curing press is essential to the production of a high-quality radial tire. It has thus become common for tire manufacturers to require repeat loading accuracy of uncured tires to precision on the order of thousandths of an inch. The precise positioning of an uncured tire with respect to the center of the lower mold cavity of a tire curing press involves two primary considerations.

First, the tire loader itself, which consists of a movable arm or other member, must be capable of repeat precision movement between two positions that are horizontally spaced. In this respect, it is necessary to bring the loader basket from a position where its centerline is aligned with a fire stand, tire holder, or conveyor position having an uncured tire located thereon, for picking up the uncured tire, and to transport it to a position in precise alignment with the lower mold cavity of a tire curing press or other apparatus into which the uncured tire is to be deposited. Numerous loaders having various arrangements of pivoting arms are known in the art to provide arcuate movement of a tire loader basket between two fixed positions. The present invention contemplates the utilization of such a loader arm or other member capable of moving a tire loader basket between two spaced positions.

The second facet of precision loading involves the precise positioning and movement of the shoes or tire-engaging members of the tire loader basket relative to the central axis of the loader basket. This requires that the loader shoes be radially independently adjustable relative to the central axis of the loader basket. Ancillary to this requirement is the necessity that the shoes of the loader basket remain in precise concentricity with the center axis of the loader basket over the entire range of radial adjustment of the shoes of the loader basket to accommodate a range of bead sizes for the different tire sizes that a fire curing press is constructed to accommodate for flexibility and economy of production. Thus, besides the necessity that the shoes of a tire loader basket move radially inwardly and outwardly to disengage and engage the upper bead of an uncured tire, it is additionally necessary that all of the shoes be capable of concentric radial adjustment to different stop positions to service the different tire bead sizes for which a particular tire loader basket is designed.

Prior-art tire loader baskets have been variously constructed to perform the functions of engaging and releasing an uncured tire and for radial adjustment to appropriately engage and disengage uncured tires having differing bead diameters. In some cases, oscillating actuating plates having a cam or scroll plate have been employed to actuate all shoes of a tire loader basket simultaneously. In other instances, individual cylinder actuators have been employed for each loader shoe of a loader basket. Various types of stops and adjustable rods have been employed for purposes of establishing the radially inner and/or outer position of the shoes of a loader basket for each different tire bead size. The lack of initial setting precision, the lost motion in employing a plurality of interconnected components, the large bead range requirements, necessitating awkward and time-consuming shoe range adjustments, and the tendency of some types of components to develop premature wear characteristics, all of which affect accuracy and cost, have precluded a broad-based adoption of any single tire loader basket design.

DISCLOSURE OF THE INVENTION

Therefore, an aspect of the present invention provides a loader basket for a loader for a tire curing press which permits an uncured tire to be located at the center of a lower mold cavity of a tire press with a high degree of accuracy. Another aspect of the invention provides such a tire basket which is capable of repeatedly accurately positioning uncured tires in a tire press over any number of repeat operating cycles. A further aspect of the invention provides such a loader basket which may be quickly and easily adjusted for use with tires of different bead sizes while positively maintaining the concentricity of the loader shoes of the loader basket over the entire adjustment range for bead size variations.

Another aspect of the present invention provides a loader basket for a loader for a tire curing press, wherein the individual shoes of the loader basket require individual adjustment to achieve concentricity with respect to the centerline of the loader basket only in a single initial setup. A further aspect of the invention provides such a loader basket wherein the stop mechanisms for radially positioning the shoes are rigidly mechanically interconnected, such that adjustment of the radial position of the shoes results in identical radial movement of all shoes. Yet another aspect of the invention provides such a loader basket wherein a single actuating cylinder and related stops provides identical movement of all of the shoes radially of the centerline of the loader basket.

Another aspect of the present invention provides a tire loader basket shoe assembly wherein all of the shoes remain substantially concentric with the center line of the basket throughout the extent of combined circumferential and axial movement. A further aspect of the invention provides such a loader basket having a basket arm connected to the shoe assembly that includes a four-element linkage with all elements having a different effective length. Still another aspect of the invention provides that a line through the center of the pivotal connections of two elements of the four-element linkage to each shoe passes through the center line of the loader basket. Yet another aspect of the invention provides that one of the two pivotal connections between two of the elements and the loader shoes has an oversize aperture to permit an extent of variation in the position and/or orientation of the loader shoes to thus be self-adjusting for variations in the geometry of green tires or of other variables.

Still another aspect of the present invention provides a loader basket that is relatively compact compared with many tire loader basket designs while providing a relatively wide bead diameter range of adjustment for tires of different sizes. A further aspect of the invention provides pivoting basket arms and basket shoes that remain within the confines of the loader basket assembly even when the loader shoes are in the maximum expanded position. A still further aspect of the invention permits adjusting both the collapsed and expanded positions of the basket shoes without disassembly of any components of the tire loader basket.

In general, the present invention contemplates a loader basket for gripping, transporting, and releasing tires, including a fixed ring, a rotating ring operatively interrelated with the fixed ring, a plurality of shoe arms pivotally attached to the fixed ring, shoe assemblies pivotally mounted on each of the shoe arms, alignment links pivotally mounted on the fixed ring and pivotally attached to each of the shoe assemblies, shoe arm actuating rods pivotally attached to each of the shoe arms and the rotating ring for pivoting the shoe arms about the fixed ring while maintaining the shoe assemblies in concentric relation during movement between collapsed and expanded positions, and an actuator for selectively moving the rotating ring relative to the fixed ring.

PREFERRED EMBODIMENT FOR CARRYING OUT THE INVENTION

Figure 1:
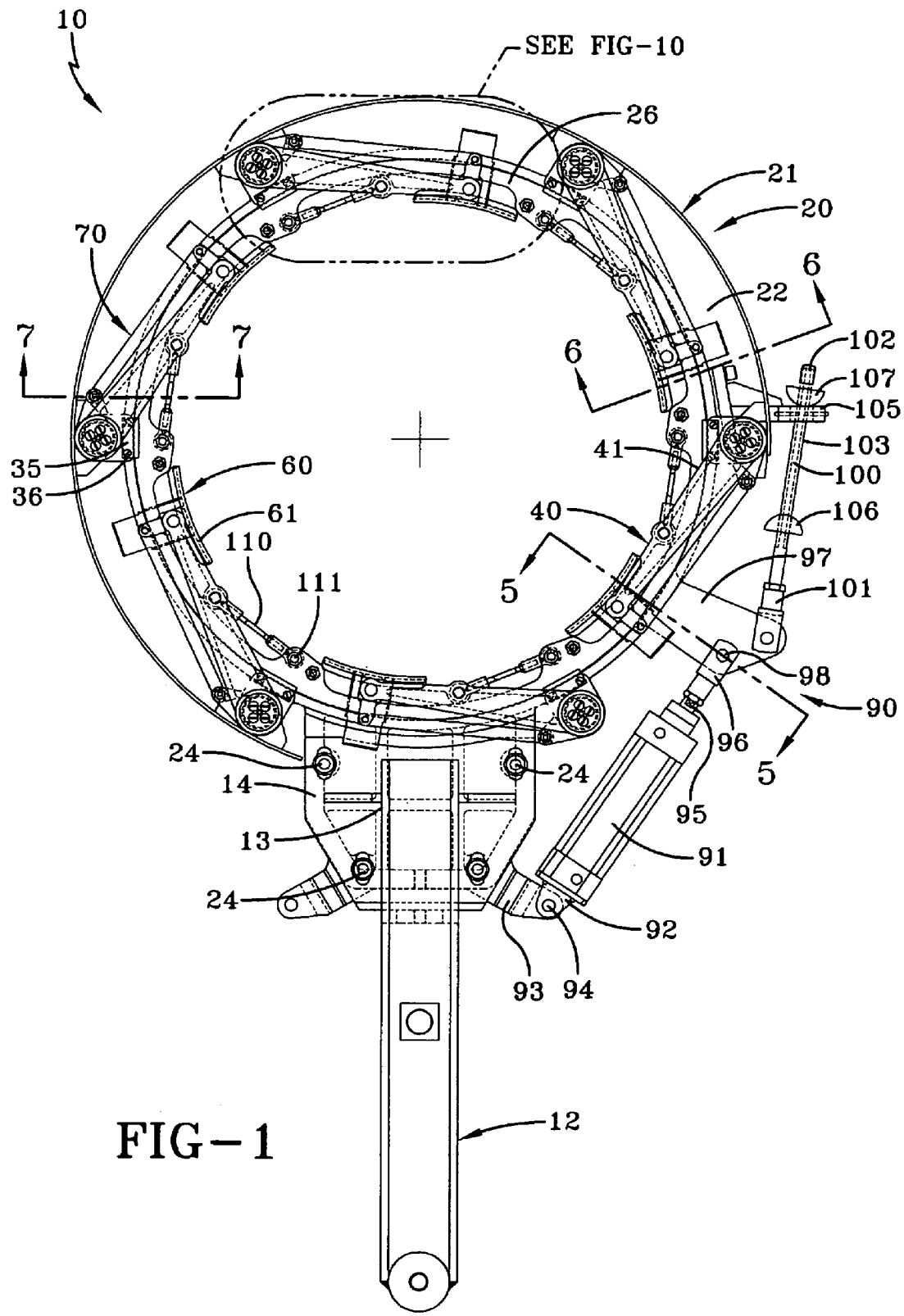
FIG. 1 is a top plan view of an exemplary tire loader basket according to the concepts of the present invention shown in conjunction with a loader arm of a tire curing press loading mechanism and showing the shoe assemblies in an expanded position.
Figure 2:
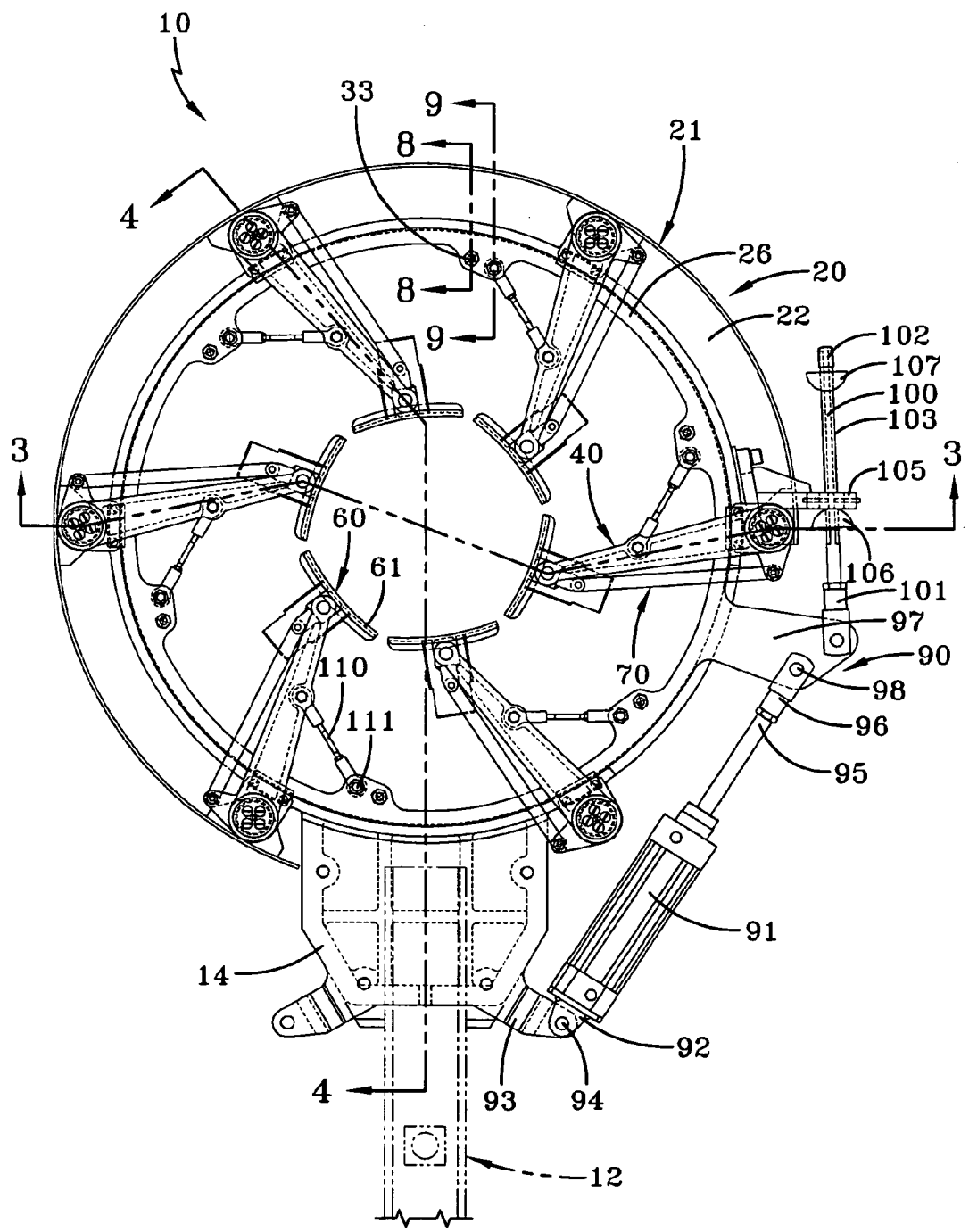
FIG. 2 is a top plan view similar to FIG. 1 showing the shoe assemblies in a collapsed position.
Figure 4:
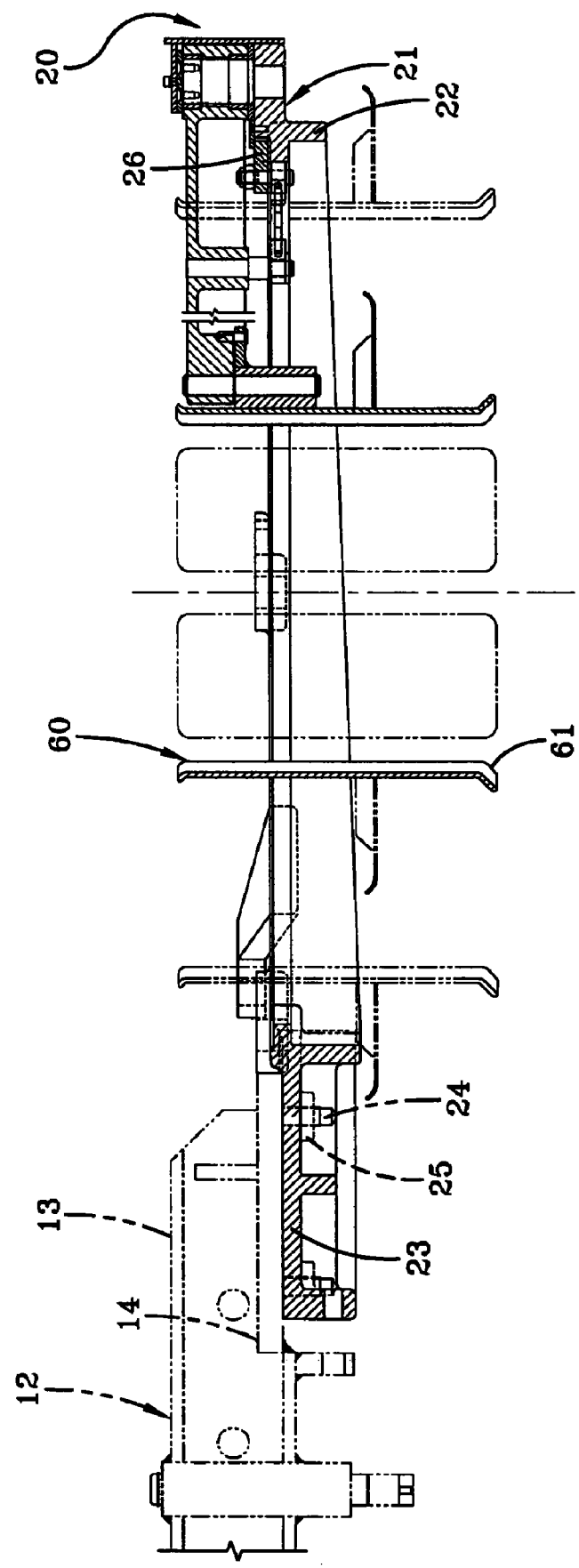
FIG. 4 is a fragmentary sectional view taken substantially along the line 4-4 of FIG. 2, showing details of an arm of the loader basket and of the loader arm.

A portion of a tire press loader embodying the concepts of the present invention is generally indicated by the numeral 10 in FIGS. 1 and 2 of the drawings. As shown in FIGS. 1, 2, and 4, the loader 10 includes a loader arm, generally indicated by the numeral 12, having a distal end 13 which carries a loader basket mounting plate 14. The loader arm 12 and loader basket mounting plate 14 are selectively vertically and horizontally movable in a conventional manner. In particular, the loader arm 12 is vertically downwardly movable to a position for picking up an uncured tire on a tire stand, holder, or other positioning device, pivotable through a horizontal angle into vertical alignment with the lower mold cavity of a tire curing press, movable vertically downwardly to position the uncured tire in the lower mold cavity, movable vertically upwardly after release of the uncured tire, and pivotable through a horizontal angle into alignment with the tire stand or the like to complete the operating sequence. A swinging jib-type loader arm 12 is depicted for exemplary purposes in FIG. 1, which is normally vertically movable and rotatably mounted on a stanchion located to one side of the mold cavity of a press. It is to be appreciated that the loader frame may be of a type which is mounted to a press head to effect the horizontal motion component. In any instance, the loader basket mounting plate 14 is operative to normally move vertically and horizontally, as necessary, to pick up an uncured tire and position it in the lower mold section of a tire curing press, as required for a particular press configuration on which a tire press loader 10 is to be operatively installed.

The loader basket mounting plate 14 suspends an exemplary tire loader basket assembly, generally indicated by the numeral 20, which is configured in accordance with the concepts of the present invention. The loader basket assembly 20 includes a frame, generally indicated by the numeral 21, which has a fixed ring 22 that is generally L-shaped. Referring particularly to FIG. 4, the fixed ring 22 has an extension 23. The basket mounting plate 14 suspends the extension 23 of fixed ring 22 by a plurality of bolts 24 and nuts 25.

Figure 8:
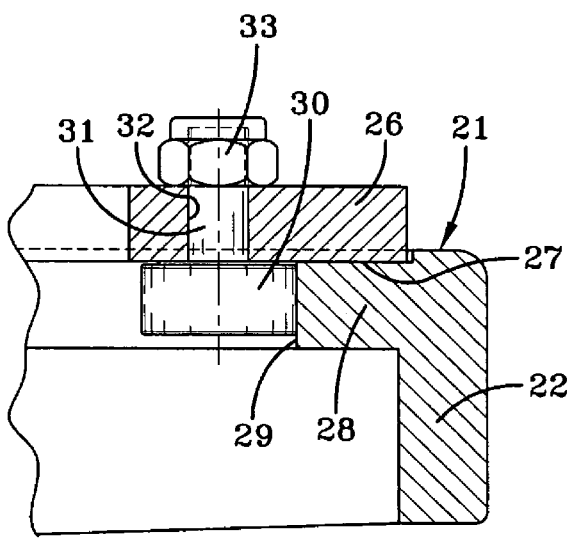
FIG. 8 is a sectional view taken substantially along line 8-8 of FIG. 2 showing the interrelation of the rotating ring cam follower and the fixed ring.
Figure 11:
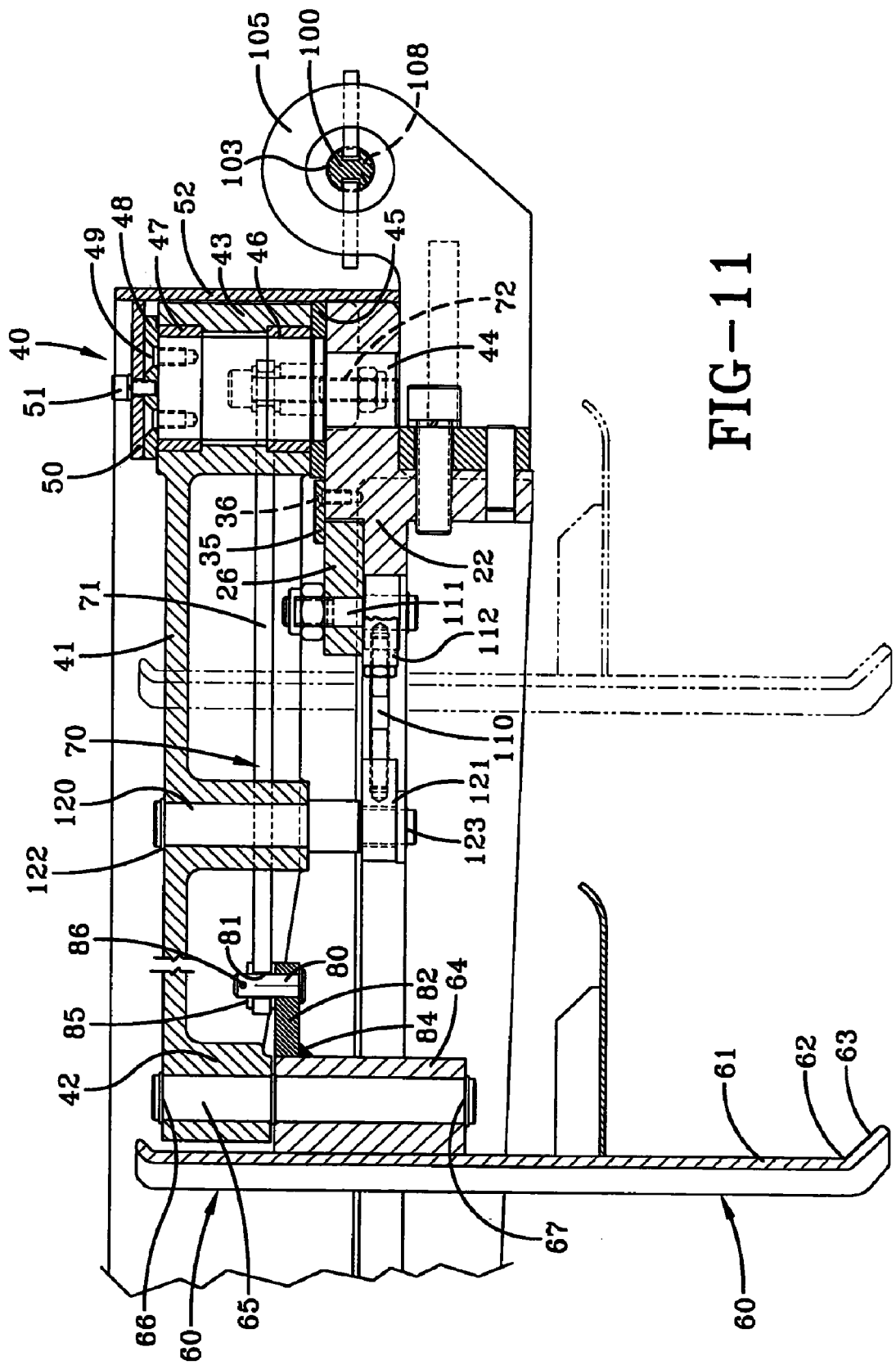
FIG. 11 is an enlarged fragmentary sectional view of the portion of FIG. 3 indicated by the chain line identified by the numeral 11, showing additional details of a shoe arm of the loader basket, an alignment link, an arm actuating rod, and a shoe assembly.

The frame 21 also includes a rotating ring 26 that operatively interrelates with the fixed ring 22. Referring to FIGS. 1, 2, 4, and 8, the rotating ring 26 overlaps and is thus supported by an inset portion 27 of a leg 28 of fixed ring 22. The rotating ring 26 is maintained centered relative to fixed ring 22 by a plurality of cam followers 30 mounted on the rotating ring 26 and engaging an edge 29 of leg 28 of the fixed ring 22. As best seen in FIGS. 2 and 8, the cam followers 30 are mounted on shafts 31 extending through bores 32 in rotating ring 26. The cam followers 30 are retained in position on rotating ring 26 by jam nuts 33 on the shafts 31. As shown, there are six cam followers 30 equiangularly spaced about rotating ring 26 to maintain it substantially concentrically aligned with the fixed ring 22 at all times. Referring particularly to FIGS. 2 and 11, the rotating ring 26 is restrained from movement upwardly of fixed ring 22, as seen in FIG. 11, by a plurality of spaced angular retainers 35. The retainers 35 are attached to the top of fixed ring 22 by fasteners 36 and overlie a portion of the top of rotating ring 26. Thus, the rotating ring 26 is positioned and retained for controlled relative rotation with respect to the fixed ring 22.

The loader basket assembly 20 also has a plurality of shoe arm assemblies, generally indicated by the numeral 40, pivotally mounted on the fixed ring 22. For example, three, four, five, six, or more shoe arm assemblies 40 may be employed, depending upon the size and construction of uncured tires to be handled. Each shoe arm assembly 40 has an elongate shoe arm 41 that extends from fixed ring 22 to loader shoe assemblies, generally indicated by the numeral 60. Inasmuch as the shoe arm assemblies 40 and the loader shoe assemblies 60 are identical, the following description is applicable to each of the six such assemblies depicted in FIGS. 1 and 2 of the drawings.

Figure 3:
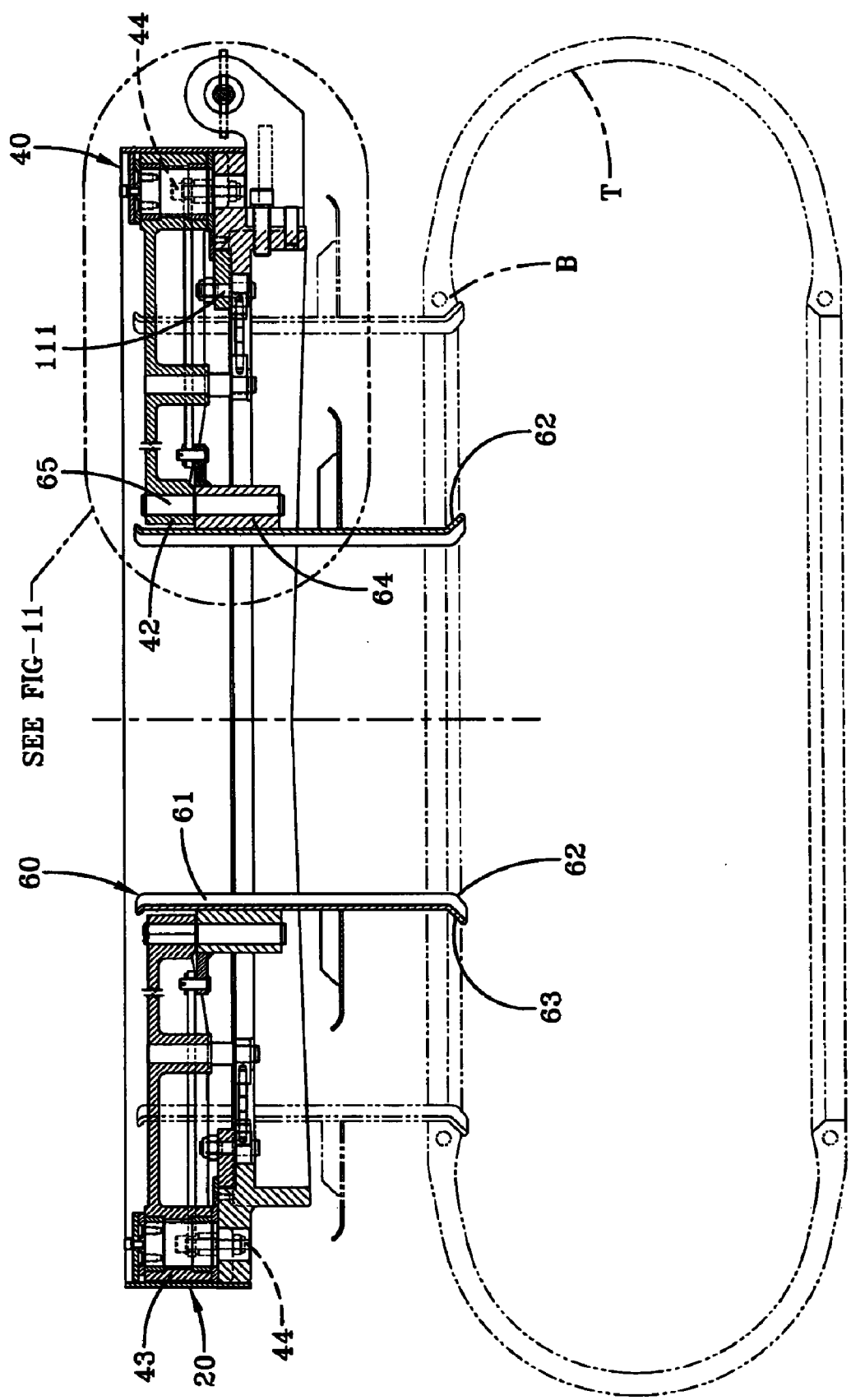
FIG. 3 is a sectional view of the tire loader basket of FIGS. 1 and 2 taken substantially along the line 3-3 of FIG. 2 and showing the shoe assemblies expanded for supporting the upper bead area of an exemplary uncured tire.

Referring particularly to FIGS. 1-3, the loader shoe assemblies 60 each have a generally vertically-oriented spine plate 61 that, as shown, may be slightly curved and of an appropriate arcuate extent depending upon the number of loader shoe assemblies 60 and the size, construction, and composition of tires T to be handled by the loader basket assembly 20. Referring particularly to FIG. 3, the spine plates 61 have a bend 62 proximate their lower extremity that forms a lip 63 that is contoured to engage a bead B of uncured tire T. The lip 63 supports the bead B of tire T from sliding off of spine plate 61 without the necessity for applying severe radial outward forces to bead B, which could cause damage or deformation to the bead area of an uncured tire.

Each loader shoe assembly 60 is freely pivotally attached to a shoe arm assembly 40. Referring particularly to FIGS. 3 and 11, the spine plate 61 carries an annular spline plate receiver 64 that is attached substantially vertically and circumferentially medially of the rear surface of the spine plate 61. The shoe arm 41 carries an annular distal end receiver 42 relative to fixed ring 22 that is adapted to be positioned in close proximity to and aligned with spine plate receiver 64. A shoe pin 65 extends through distal end receiver 42 and spine plate receiver 64 to pivotally interconnect spine plate 61 and shoe arm 41. The shoe pin 65 carries an upper retaining ring 66 and a lower retaining ring 67 to maintain shoe pin 65 in the position best seen in FIG. 11.

The end of shoe arm 41 opposite distal end receiver 42 at fixed ring 22 has a proximal end receiver 43 that overlies and is supported by a portion of fixed ring 22. Referring to FIG. 11, an arm pivot pin 44 extends through both the shoe arm 41 and fixed ring 22. The lower side of shoe arm 41 rests on a washer 45 that also supports a lower bushing 46 interposed between proximal end receiver 43 and pivot pin 44. An upper bushing 47 is interposed between the axial upper extremity of pivot pin 44 and proximal end receiver 43. A washer 48 overlies upper bushing 47 and proximal end receiver 43 and is attached to pivot pin 44 by screws 49. A cover 50 overlies washer 48 and is secured by screw 51. A guard 52 extends about the radial outer periphery of proximal end receiver 43 and fixed ring 22.

Figure 7:
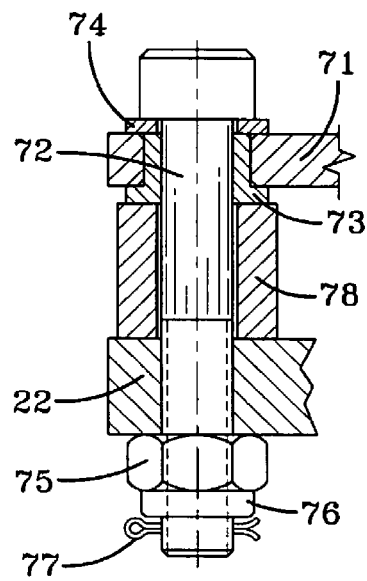
FIG. 7 is a fragmentary sectional view taken substantially along line 7-7 of FIG. 1 showing the attachment of an alignment link of the loader basket to the fixed ring.

Positioned proximate to and somewhat aligned with each shoe arm 41 is a shoe alignment mechanism, generally indicated by the numeral 70, as seen in FIGS. 1 and 2. As seen in detail in FIGS. 7, 10, and 11, the alignment mechanism has an elongate alignment link 71 that extends from the fixed ring 22 to the related shoe assembly 60 to maintain the desired orientation of the spine plate 61. The alignment link 71 is freely rotatably mounted on a bolt 72 that serves as a pivot axis therefor. A bushing 73 and a washer 74 are interposed between the bolt 72 and the alignment link 71. The bolt 72 also passes through the fixed ring 22 and is secured in place by a nut 75 that is backed up by a washer 76 and a cotter pin 77. The position of alignment link 71 above fixed ring 22 is established by a cylindrical spacer 78. As shown, the alignment link is of a somewhat lesser length than the shoe arm 41.

Figure 5:
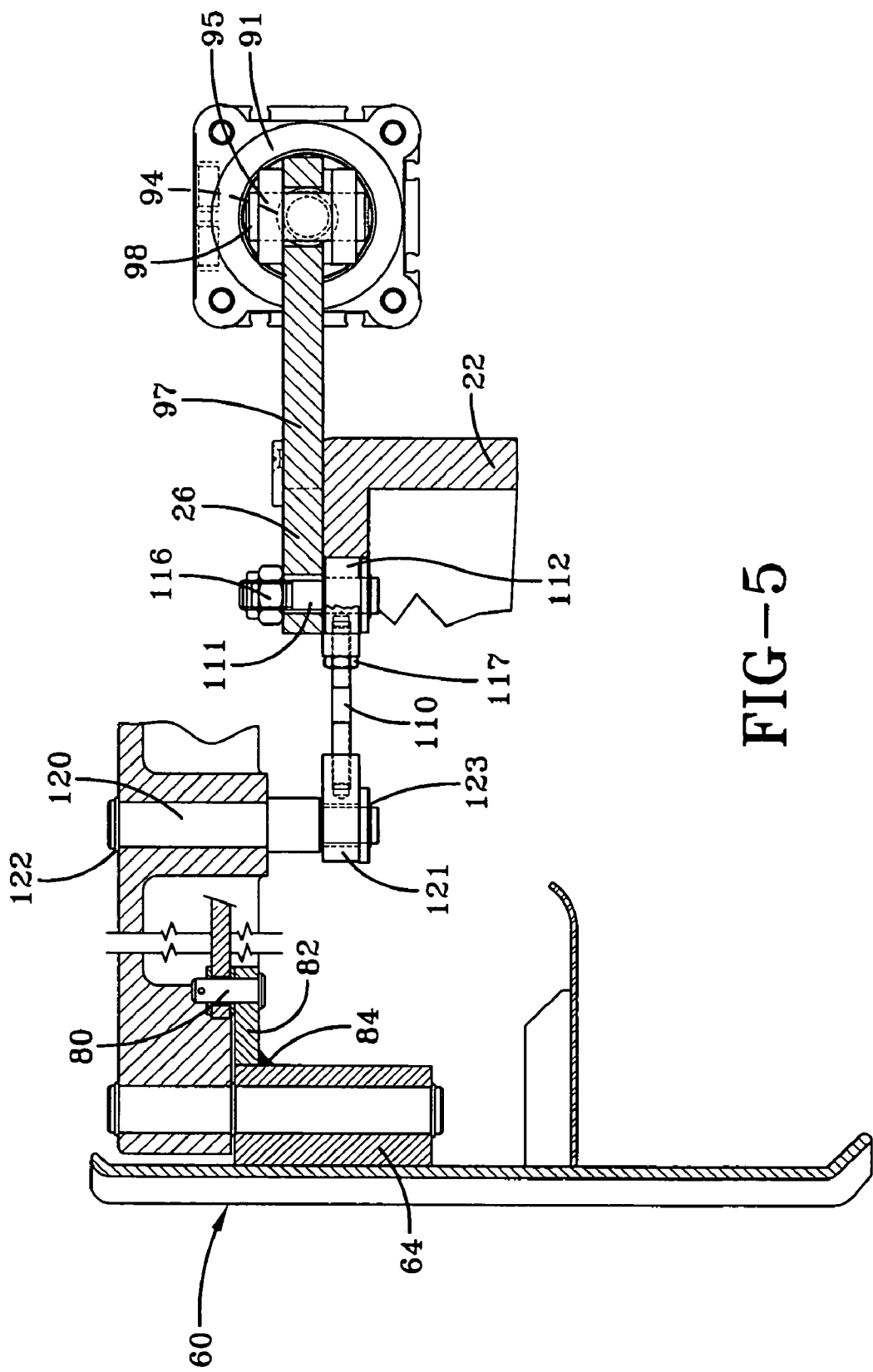
FIG. 5 is a fragmentary sectional view taken substantially along the line 5-5 of FIG. 1, showing details of a shoe arm of the loader basket and its interrelation with the actuating cylinder therefor.
Figure 6:
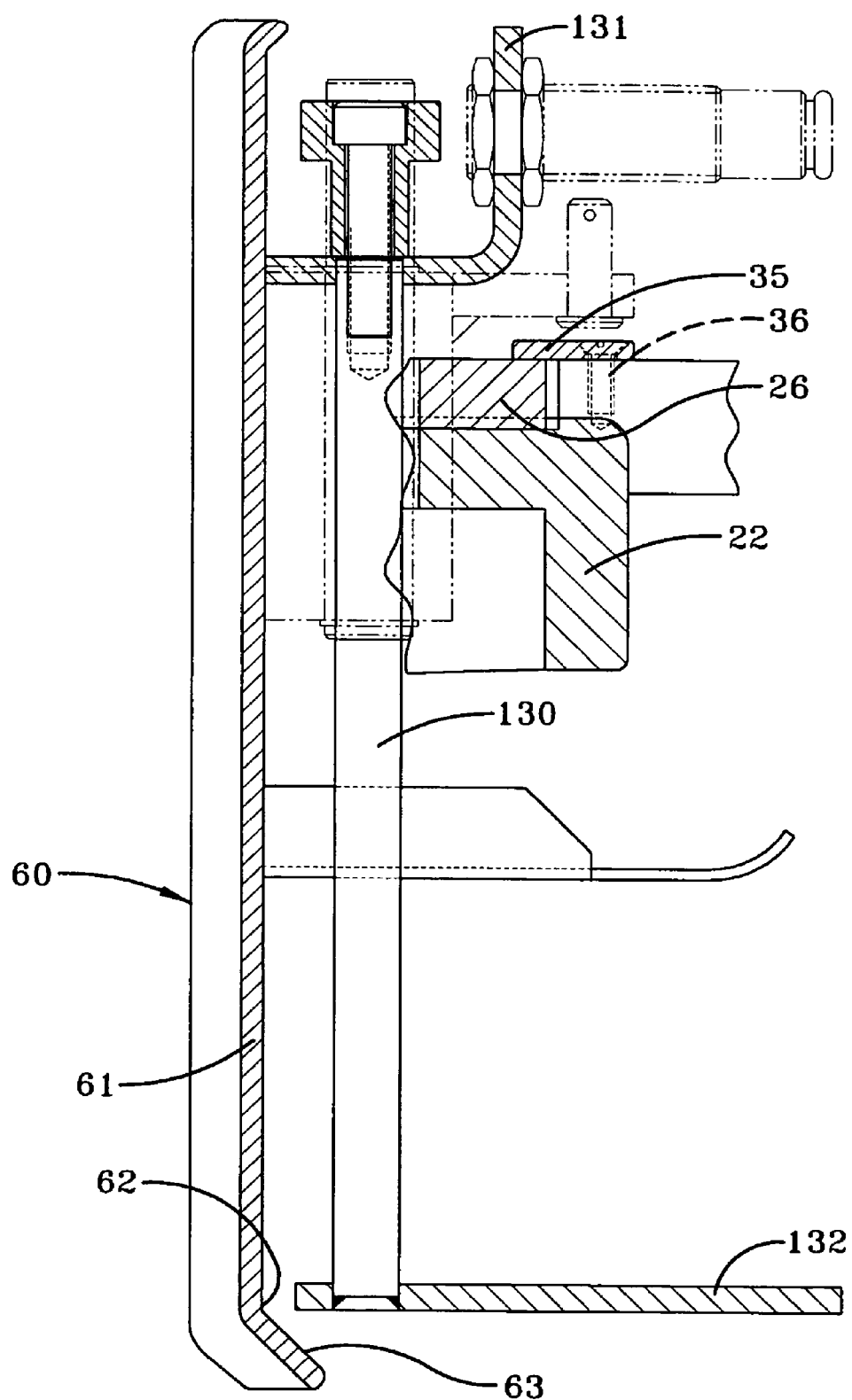
FIG. 6 is a sectional view taken substantially along line 6-6 of FIG. 1, showing the interrelation between a shoe arm of the loader basket and a loader shoe assembly and a tire detector mechanism.
Figure 10:
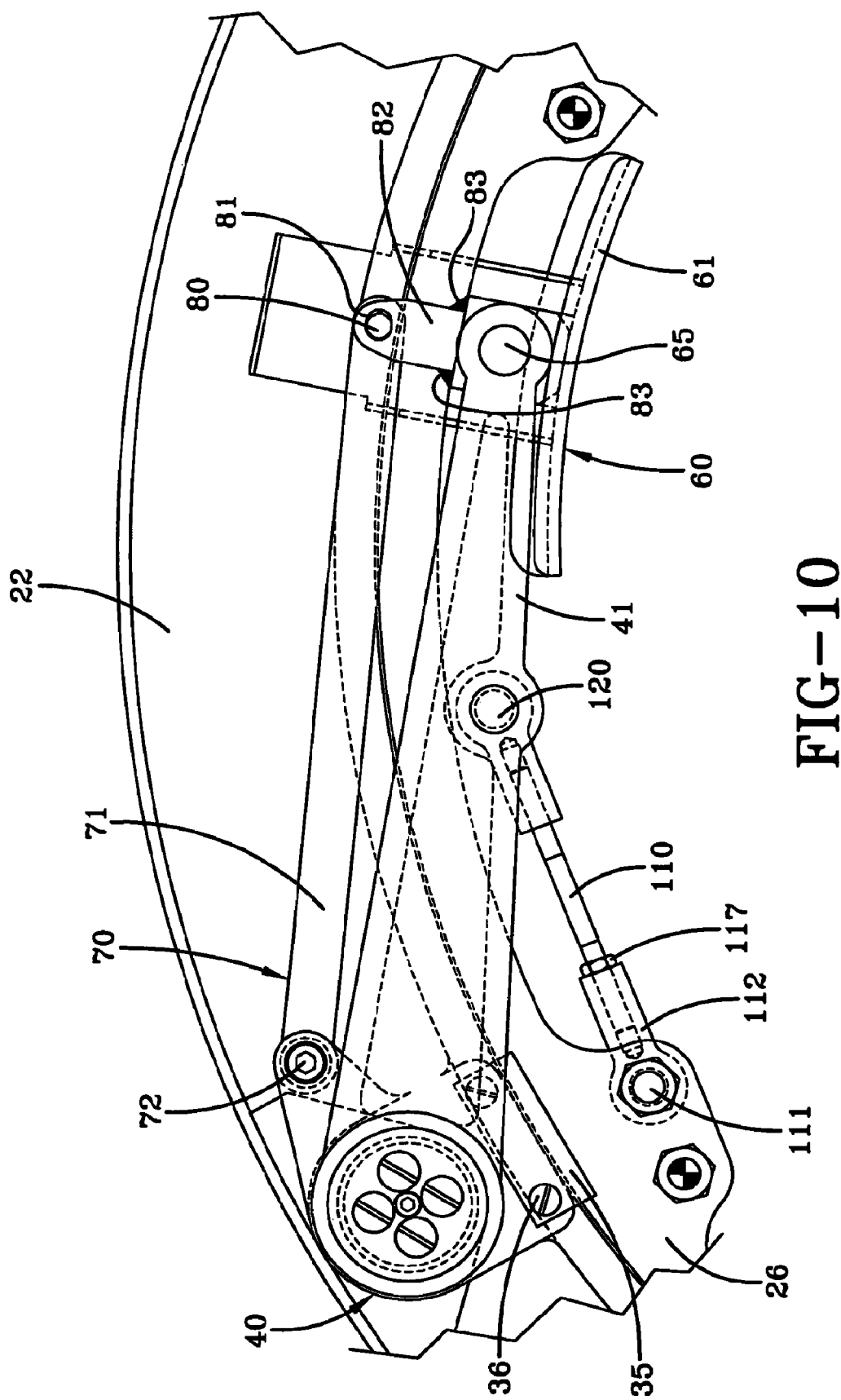
FIG. 10 is an enlarged fragmentary plan view of the portion of FIG. 1 indicated by the chain line identified by the numeral 10, showing details of the relation between a shoe arm of the loader basket, an alignment link, an arm actuating rod, and a shoe assembly.

The alignment link 71 receives a pivot pin 80 at the end opposite the bolt 72 in a bore 81. The pivot pin 80 also extends through an alignment plate 82 of the loader shoe assembly 60. In particular, the spine plate receiver 64 rigidly mounts alignment plate 82 by a plurality of welds 83 and 84, as best seen in FIGS. 5, 10, and 11. The pivot pin 80 is retained in position by a washer 85 and a roll pin 86 (FIG. 11). As may be appreciated from FIG. 10, the bore 81 may be somewhat oversized with respect to pivot pin 80 to permit an extent of play or adjustment in the orientation of loader shoe assemblies 60. Alternatively, the oversize bore may be in alignment plate 82 or surrounding bolt 72.

The orientation of the spine plates 61 of shoe assemblies 60 is thus controlled by the rotation of shoe arm 41 about shoe pivot pin 65 and alignment link 71 about pivot pin 80. This results in the spine plates 61 all maintaining concentricity with respect to the center line of the fixed ring 22 in the expanded position of FIG. 1, the contracted position of FIG. 2, and all positions therebetween. This allows the lips 63 of spine plates 61 to exert substantially uniform forces about the circumferential bead B of an uncured tire T. It can also be appreciated from FIGS. 1 and 2 that at all positions of the spine plates 61, a line through the center of the shoe pivot pin 65 and the center of pivot pin 80 passes through the center line of the fixed ring 22. Any minor variations from this alignment may be compensated for by the play permitted by pivot pin 80 moving minimally in the oversized bore 81 when shoe assemblies 60 engage a tire bead B.

The movement of the shoe assemblies 60 is controlled by a shoe actuating mechanism, generally indicated by the numeral 90 in FIGS. 1 and 2. As seen in FIGS. 1, 2, and 5, the motive force for shoe actuating mechanism 90 is provided by a fluid actuating cylinder 91. The blind end 92 of actuating cylinder 91 is attached to a standoff bracket 93 by a pin 94. The standoff bracket 93 is attached to extension 23 of fixed ring 22. The rod end 95 of actuating cylinder 91 carries a rod clevis 96 that is attached to a radial projection 97 of rotating ring 26 by a pin 98. Thus, the actuating cylinder 91 effects relative rotation between fixed ring 22 and rotating ring 26.

As seen in FIGS. 1 and 2, the extent of throw of the actuating cylinder 91 is controlled by an adjusting rod 100 having a rod clevis 101 at one end and a cap 102 at the other end thereof. The rod clevis 101 is attached to the radial projection 97 to which the actuating cylinder 91 is also attached. The rod 100 has threads 103 over a substantial portion of its length and is supported in part by a stopper bar 105 having an aperture (not shown) through which the adjusting rod 100 extends. A pair of adjustable stops 106 and 107 having internal threads 108 (FIG. 11) engage the threads 103 of the stopper bar 105 to permit independent selective adjustment of the stops 106 and 107 axially along the stopper bar. As seen in FIG. 1, the stop 107 establishes the maximum expanded position of the shoe assemblies 60 for the engagement of a tire bead size being handled by the loader basket assembly 20. The stop 106 establishes a minimum collapsed position of the shoe assemblies 60 necessary for insertion radially within the bead area of an uncured tire being handled by loader basket assembly 20.

Figure 9:
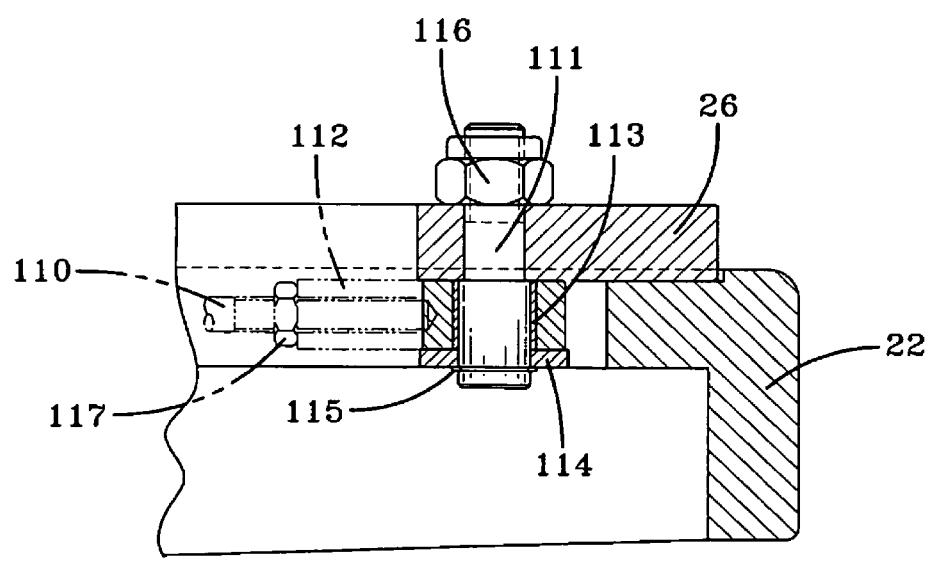
FIG. 9 is a sectional view taken substantially along line 9-9 of FIG. 2, showing the attachment of a shoe arm actuating rod to the rotating ring.

The shoe actuating mechanisms 90 have shoe arm actuating rods 110 that transfer movement imparted to rotating ring 26 from radial projection 97 to each shoe arm assembly 40. The shoe arm actuating mechanism 90 is pivotally attached to rotating ring 26 by a pivot pin 111. As best seen in FIGS. 9-11, the pivot pin 111 extends through rotating ring 26 and a clevis 112 attached to actuating rod 110. A bearing 113 is located between the pivot pin 111 and the clevis 112 (FIG. 9). The pivot pin 111 is axially restrained below clevis 112 by a washer 114 and a retaining ring 115. The pivot pin 111 is axially restrained above the rotating ring 26 by a jam nut 116. Each of the rods 110 can be rotated to precisely establish equal radial positioning of all of the loader shoe assemblies 60. Thereafter, jam nuts 117 threaded on the rods 110 may be tightened into locking engagement with the respective devises 112.

The end of the shoe arm actuating rods 110 opposite the pivot pins 111 are pivotally attached to a shoe arm 41 of shoe arm assemblies 40 by a pivot pin 120. As best seen in FIGS. 5, 10, and 11, the pivot pin 120 extends through shoe arm 41 and a clevis 121 threaded on rod 110 at the end opposite the clevis 112. The pivot pin 120 is axially restrained above shoe arm 41 by a retaining ring 122 and below clevis 121 by a retaining ring 123. Thus, motion of rotating ring 26, as controlled by actuating cylinder 91, moves the actuating rods 110 and shoe arms 41 to produce coordinated combined circumferential and radial motion of the shoe assemblies 60.

If desired, a tire detector 130 may be mounted in conjunction with the shoe assemblies 60 to signal the presence of an uncured tire T in engagement with lips 63 of spine plates 61. The tire detector 130 is suspended from a bracket 131 and carries a horizontally disposed contact bar 132 adapted to engage the bead B of a tire T when positioned on lips 63 of shoe assemblies 60.

Thus, it should be evident that the tire loader basket disclosed herein carries out one or more of the objects of the present invention set forth above and otherwise constitutes an advantageous contribution to the art. As will be apparent to persons skilled in the art, modifications can be made to the preferred embodiment disclosed herein without departing from the spirit of the invention, the scope of the invention herein being limited solely by the scope of the attached claims.

The invention claimed is:

1. A loader basket for gripping, transporting, and releasing tires comprising, a fixed ring, a rotating ring operatively interrelated with said fixed ring, a plurality of shoe arms pivotally attached to said fixed ring, shoe assemblies pivotally mounted on each of said shoe arms, alignment links pivotally mounted on said fixed ring and pivotally attached to each of said shoe assemblies, shoe arm actuating rods pivotally attached to each of said shoe arms and said rotating ring for pivoting said shoe arms about said fixed ring while maintaining said shoe assemblies in concentric relation during movement between collapsed and expanded positions, and an actuator for selectively moving said rotating ring relative to said fixed ring.

2. A loader basket according to claim 1, wherein said alignment links are of a different length than said shoe arms.

3. A loader basket according to claim 1, wherein said alignment links are of a lesser length than said shoe arms.

4. A loader basket according to claim 1, wherein the pivotal attachment of said shoe arms to said fixed ring and the pivotal mounting of said alignment links on said fixed ring are offset.

5. A loader basket according to claim 1, wherein the pivotal mounting of said shoe arms on said shoe assemblies and the pivotal attachment of said alignment links to said shoe assemblies have a line through the centers thereof at all times passing through the center line of said fixed ring.

6. A loader basket according to claim 1, wherein the pivotal attachment of said alignment links to said shoe assemblies is a bolt extending through a first bore in said alignment link and a second bore in said loader shoe assembly with one of said bores being oversized to permit an extent of adjustment in the location of the loader shoe assembly.

7. A loader basket according to claim 1, wherein said actuator is a fluid cylinder connected to said fixed ring and said rotating ring.

8. A loader basket according to claim 7, wherein the operative throw of said cylinder is controlled by an adjusting rod movable with said rotating ring.

9. A loader basket according to claim 8, wherein said cylinder operates a projection of said rotating ring and said adjusting rod is attached to said projection and moves therewith.

10. A loader basket according to claim 9, wherein said adjusting rod is also supported by a stopper bar and has movable stops for engaging said stopper bar.

11. A loader basket according to claim 9, wherein said adjusting rod is threaded and first and second stops are threaded on said adjusting rod, one to either side of said stopper bar to establish a maximum expanded position and a minimum contracted position of said shoe assemblies.

12. A loader basket according to claim 1, wherein said shoe arm actuating rods are threaded and have the ends thereof threaded into clevises to rotatably vary the axial length thereof to establish equal radial positioning of all of said loader shoe assemblies.

13. A loader basket according to claim 12, wherein jamb nuts on said shoe arm actuating rods selectively engage a clevis to maintain a selected axial length of said shoe arm actuating rods.

14. A basket for engaging an uncured tire comprising a frame, a fixed ring of said frame, a rotating ring of said frame supported for rotation relative to said fixed ring, a shoe arm pivotally attached to said fixed ring, a shoe assembly mounted on said shoe arm by a shoe pin, an alignment link pivotally mounted on said fixed ring and attached to said shoe assembly at a pivot pin, and an actuating rod pivotally attached to said shoe arm and said rotating ring, and a fluid actuator selectively moving said rotating ring relative to said fixed ring, said fixed ring, said shoe arm, said alignment link, and said shoe assembly being sized and arranged such that a line through said shoe pin and said pivot pin passes through the center of said fixed ring throughout the movement of said shoe assembly.

15. A basket according to claim 14, wherein said shoe arm has an alignment plate receiving said shoe pin and said pivot pin.

16. A basket according to claim 15, wherein said shoe assembly has a spine plate for engaging an uncured tire pivotal about said shoe pin of said alignment plate.

17. A basket according to claim 14, wherein said alignment link is of a different effective length than said shoe arm.

18. A tire curing press loader comprising, a movable loader arm, a loader basket assembly carried by said loader arm, a fixed ring of said loader basket assembly, a rotating ring supported by said fixed ring, a plurality of shoe arms pivotally attached to said fixed ring, shoe assemblies pivotally mounted on each of said shoe arms, alignment links pivotally mounted on said fixed ring and pivotally attached to each of said shoe assemblies, shoe arm actuating rods pivotally attached to each of said shoe arms and said rotating ring for pivoting said shoe arms about said fixed ring so that said shoe assemblies move circumferentially and radially of said fixed ring during movement between collapsed and expanded positions, and means to selectively move said rotating ring relative to said fixed ring.

19. A tire curing press loader according to claim 18, wherein said means to selectively move said rotating ring relative to said fixed ring is a fluid cylinder.

20. A tire curing press loader according to claim 18, wherein the pivotal mounting of said shoe arms on said shoe assemblies and the pivotal attachment of said alignment links to said shoe assemblies have a line through the centers thereof at all times passing through the center line of said fixed ring.

* * * * *